United States Patent
Djikpesse et al.

(10) Patent No.: US 9,146,330 B2
(45) Date of Patent: Sep. 29, 2015

(54) SELECTING A SURVEY SETTING FOR CHARACTERIZING A TARGET STRUCTURE

(75) Inventors: Hugues A. Djikpesse, Cambridge, MA (US); Michael David Prange, Somerville, MA (US); Mohamed-Rabigh Khodja, Quincy, MA (US); Sebastien Duchenne, Montpellier (FR); Henry Menkiti, Twickenham (GB)

(73) Assignee: WesternGeco L.L.C., Houston, TX (US)

( * ) Notice: Subject to any disclaimer, the term of this patent is extended or adjusted under 35 U.S.C. 154(b) by 807 days.

(21) Appl. No.: 13/421,731

(22) Filed: Mar. 15, 2012

(65) Prior Publication Data

US 2012/0250455 A1 Oct. 4, 2012

Related U.S. Application Data

(60) Provisional application No. 61/468,781, filed on Mar. 29, 2011.

(51) Int. Cl.
*G01V 1/28* (2006.01)
*G01V 1/30* (2006.01)

(52) U.S. Cl.
CPC .. *G01V 1/28* (2013.01); *G01V 1/30* (2013.01); *G01V 2210/66* (2013.01); *G01V 2210/72* (2013.01)

(58) Field of Classification Search
CPC G01V 1/30; G01V 2210/667; G01V 2210/72
USPC .......................................... 367/13, 73; 702/14
See application file for complete search history.

(56) References Cited

U.S. PATENT DOCUMENTS

| | | | |
|---|---|---|---|
| 4,585,939 A * | 4/1986 | Arnold et al. | 250/256 |
| 4,717,825 A * | 1/1988 | Smith et al. | 250/256 |
| 4,799,157 A * | 1/1989 | Kucuk et al. | 702/12 |
| 5,870,690 A * | 2/1999 | Frenkel et al. | 702/7 |
| 6,326,786 B1 * | 12/2001 | Pruessmann et al. | 324/312 |
| 6,549,854 B1 | 4/2003 | Malinverno et al. | |
| 6,618,676 B2 * | 9/2003 | Kriegshauser et al. | 702/7 |
| 8,589,078 B2 * | 11/2013 | Djikpesse et al. | 702/11 |
| 2003/0055566 A1 * | 3/2003 | Kriegshauser et al. | 702/7 |
| 2004/0019427 A1 * | 1/2004 | San Martin et al. | 702/6 |
| 2004/0186667 A1 * | 9/2004 | Lee | 702/14 |
| 2004/0223411 A1 | 11/2004 | Vossen et al. | |
| 2007/0061080 A1 * | 3/2007 | Zhdanov | 702/7 |
| 2007/0255499 A1 * | 11/2007 | Strack et al. | 702/11 |
| 2009/0248308 A1 | 10/2009 | Luling | |
| 2010/0207624 A1 * | 8/2010 | Lionheart et al. | 324/258 |

(Continued)

OTHER PUBLICATIONS

Ashton et al., "3D Seismic Survey Design", Oilfield Review, vol. 6(1), Apr. 1994, pp. 19-32..

(Continued)

*Primary Examiner* — Ari M Diacou
(74) *Attorney, Agent, or Firm* — Abimbola Bukoye

(57) ABSTRACT

Complex-valued sensitivity data structures corresponding to respective candidate survey settings are provided, where the sensitivity data structures relate measurement data associated with a target structure to at least one parameter of a model of the target structure. Based on the sensitivity data structures, a subset of the candidate survey settings is selected according to a criterion for enhancing resolution in characterizing the target structure.

21 Claims, 4 Drawing Sheets

---

```
┌─────────────────────────────────────────────────────────┐
│ CALCULATE SENSITIVITY DATA STRUCTURES CORRESPONDING     │──302
│         TO RESPECTIVE CANDIDATE SURVEY SETTINGS         │
└─────────────────────────────────────────────────────────┘
                              │
                              ▼
┌─────────────────────────────────────────────────────────┐
│   SELECT A SUBSET OF THE CANDIDATE SURVEY SETTINGS      │──304
│              FOR ENHANCING A RESOLUTION IN              │
│       CHARACTERIZING A SUBTERRANEAN STRUCTURE           │
└─────────────────────────────────────────────────────────┘
```

(56) References Cited

U.S. PATENT DOCUMENTS

| | | | |
|---|---|---|---|
| 2011/0022319 A1* | 1/2011 | Djikpesse et al. | 702/11 |
| 2013/0258810 A1* | 10/2013 | Hu | 367/73 |
| 2014/0081575 A1* | 3/2014 | Djikpesse et al. | 702/11 |
| 2014/0122037 A1* | 5/2014 | Prange et al. | 703/2 |
| 2014/0244176 A1* | 8/2014 | Hanak | 702/9 |

OTHER PUBLICATIONS

Backus et al., "The Resolving Power of Gross Earth Data", Geophys. J. R. Astr. Soc., vol. 16, 1968, pp. 169-205.

Berryman, "Analysis of Approximate Inverses in Tomograph—I. Resolution Analysis of Common Inverses", Optimization and Engineering, 1(1), 2000, pp. 87-115.

Beylkin, "Imaging of discontinuities in the inverse scattering problem by inversion of a causal generalized Radon transform", J. Math Phys., vol. 26(1), Jan. 1985, pp. 99-108.

Chaloner et al., Bayesian Experimental Design: A Review, Statistical Science, vol. 10(3), 1995, pp. 273-304.

Coles et al., "A method of fast, sequential experimental design for linearized geophysical inverse problems", Geophys. J. Int., vol. 178, 2009, pp. 145-158.

Curtis, "Optimal design of focused experiments and surveys", Geophys. J. Int., vol. 139, 1999, pp. 205-215.

Curtis, "Optimal experiment design: cross-borehole tomographic examples", Geophys. J. Int., vol. 136, 1999, pp. 637-650.

Djikpesse et al., "Bayesian Survey Design for Maximal Waveform Inversion Resolution", submitted to Geophysics, 2010, pp. 1-21.

Djikpesse et al., "Borehole-guided AVO analysis of P-P and P-S reflections: Quantifying uncertainty on density estimates", Geophysical Prospecting, vol. 54, 2006, pp. 515-523.

Djikpesse et al., "Multiparameter ρ1 norm waveform fitting: Interpretation of Gulf of Mexico reflection seismograms", Geophysics, vol. 64(4), 1999, pp. 1023-1035.

Dykstra, "The Augmentation of Experimental Data to Maximize X'X", Technometrics, vol. 13(3), 1971, pp. 682-688.

Galbraith, "A new methodology for 3D survey design", The Leading Edge, Oct. 2004, pp. 1017-1023.

Igel et al., "Waveform inversion of marine reflection seismograms for P impedance and Poisson's ratio", Geophys. J. Int., vol. 124, 1996, pp. 363-371.

Khodja et al., "An Equivalence Class of Bayesian Design Criteria", submitted to Technometrics, 2010, pp. 1-4.

Khodja et al., "Bayesian Survey Design with Dipping Scatterers", 2010, pp. 1-4.

Khodja et al., "Guided Bayesian optimal experimental design", Inverse Problems, vol. 26, 2010, pp. 1-20.

Liner et al., "3-D seismic survey design as an optimization problem", The Leading Edge, Sep. 1999, 5 pages.

Miller et al., "A new slant on seismic imaging: Migration and integral geometry", Geophysics, vol. 52(7), 1987, pp. 943-964.

Minkoff, "A computationally feasible approximate resolution matrix for seismic inverse problems", Geophys. J. Int., vol. 126, 1996, pp. 345-359.

Nolet, "Solving or Resolving Inadequate and Noisy Tomographic Systems", Journal of Computational Physics, vol. 61, 1985, pp. 463-482.

Nolet et al., "Explicit, approximate expressions for the resolution and a posteriori covariance of massive tomographic systems", Geophys. J. Int., vol. 138, 1999, pp. 36-44.

Oldenborger et al., "The point-spread function measure of resolution for the 3-D electrical resistivity experiment", Geophys. J. Int., vol. 176, 2009, pp. 405-414.

Routh et al., "Optimal Survey design using the point spread function measure of resolution", SEG Expanded Abstracts, SEG Houston Annual Meeting, 2005, 5 pages.

Zhu et al., "Plane-wave propagation in attenuative transversely isotropic media", Geophysics, vol. 71(2), 2006, pp. T17-T30.

Tarantola et al., "Generalized Nonlinear Inverse Problems Solved Using the Least Squares Criterion", Reviews of Geophysics and Space Physics, vol. 20(2), May 1982, pp. 219-232.

Tarantola, "Inversion of seismic reflection data in the acoustic approximation", Geophysics, vol. 49(8), Aug. 1984, pp. 1259-1266.

Tarantola, "Theoretical Background for the Inversion of Seismic Waveforms, Including Elasticity and Attenuation", Pure and Applied Geophysics, vol. 128 (1/2), 1988, pp. 365-399.

Vermeer, "3D seismic survey design optimization", The Leading Edge, Oct. 2003, 5 pages.

Xu et al., "Estimating seismic attenuation (Q) from VSP data", CSEG Recorder, Sep. 2006, pp. 57-61.

Zhang et al., "Estimation of resolution and covariance for large matrix inversions", Geophys. J. Int., vol. 121, 1995, pp. 409-426.

International Search Report and Written Opinion of PCT Application No. PCT/US2012/030240 dated Nov. 1, 2012: pp. 1-8.

* cited by examiner

SELECTING A SURVEY SETTING FOR CHARACTERIZING A TARGET STRUCTURE

CROSS REFERENCE TO RELATED APPLICATION

This application claims benefit under 35 U.S.C. §119(e) of U.S. Provisional Patent Application Ser. No. 61/468,781 filed Mar. 29, 2011, which is hereby incorporated by reference.

BACKGROUND

Survey operations can be performed to acquire measurement data for characterizing content of a subterranean structure. Examples of survey operations include seismic survey operations and electromagnetic survey operations. Survey operations can be performed using survey equipment deployed at or above an earth surface that is above the subterranean structure of interest. Alternatively, at least part of the survey equipment can be deployed in wellbore(s).

Once survey data is acquired, the survey data can be analyzed to characterize the subterranean structure, such as by developing an image or other representation of the subterranean structure, where the image or other representation contains properties of the subterranean structure.

SUMMARY

In general, according to some embodiments, complex-valued sensitivity data structures corresponding to respective candidate survey settings are provided, where the sensitivity data structures relate measurement data associated with a target structure to at least one parameter of a model of the target structure. Based on the sensitivity data structures, a subset of the candidate survey settings is selected according to a criterion for enhancing resolution in characterizing the target structure.

In general, according to further embodiments, an article comprising at least one machine-readable storage medium stores instructions that upon execution cause a system to calculate complex-valued sensitivity data structures corresponding to respective candidate survey settings, where the sensitivity data structures relate measurement data associated with a target structure to at least one parameter of a model of the target structure. Based on the sensitivity data structures, a subset of the candidate survey settings is selected according to a criterion for enhancing resolution in characterizing the target structure.

In general, according to further embodiments, a system includes at least one storage medium to store complex-valued sensitivity data structures corresponding to respective candidate survey settings, where the sensitivity data structures relate measurement data associated with a target structure to at least one parameter of a model of the target structure. At least one processor is to select, based on the sensitivity data structures, a subset of the candidate survey settings according to a criterion for enhancing resolution in characterizing the target structure.

In further or other implementations, the criterion is based on identifying at least one of the candidate survey settings that reduces posterior uncertainty.

In further or other implementations, an iterative procedure is performed, the iterative procedure including: adding one of the sensitivity data structures to a collection of sensitivity data structures previously considered; and based on a present content of the collection of the sensitivity data structures, identifying, according to the criterion, one of the candidate survey settings corresponding to the present content of the collection.

In further or other implementations, the iterative procedure further includes: determining whether a convergence condition has been satisfied; and if the convergence condition has not been satisfied, continuing with the iterative procedure by adding a further sensitivity data structure to the collection, and based on a further present content of the collection, identifying, according to the criterion, one of the candidate survey settings corresponding to the further present content of the collection.

In further or other implementations, survey equipment is configured according to the at least one survey setting to perform a survey operation of the target structure.

In further or other implementations, a particular one of the candidate survey settings includes at least one item selected from the group consisting of: type of survey equipment, a position of at least one component of the survey equipment, at least one operational characteristic of the survey equipment.

In further or other implementations, the criterion is according to a ratio between a determinant of a prior covariance matrix and a determinant of a posterior covariance matrix.

In further or other implementations, the sensitivity data structures include information relating to the at least one model parameter that is sensitive to a subregion less than an entirety of the target structure.

In further or other implementations, the at least one parameter of the model accounts for an anisotropic radiation pattern of a scatterer in the target structure.

In further or other implementations, the at least one parameter of the model is based on a function that encodes a shape of the scatterer.

In further or other implementations, selecting the subset of the candidate survey settings comprises selecting a particular candidate survey setting plural times to allow for stacking of measurement data acquired by the particular candidate survey setting.

In further or other implementations, a process including the calculating and selecting is used to identify, for further processing, a subset of measurement data acquired by a survey arrangement.

In further or other implementations, the sensitivity data structures relate perturbations of measurement data to perturbations of the at least one model parameter.

In further or other implementations, the target structure comprises a target subterranean structure.

In further or other implementations, the criterion is based on prior covariance information relating to the model.

In further or other implementations, the criterion is based on a value derived from a determinant of the prior covariance information and a determinant of posterior covariance information.

In further or other implementations, the selecting is performed using an iterative procedure in which individual ones of the sensitivity data structures are added to a collection of sensitivity data structures for consideration with successive iterations.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Introduction

Figure 1:
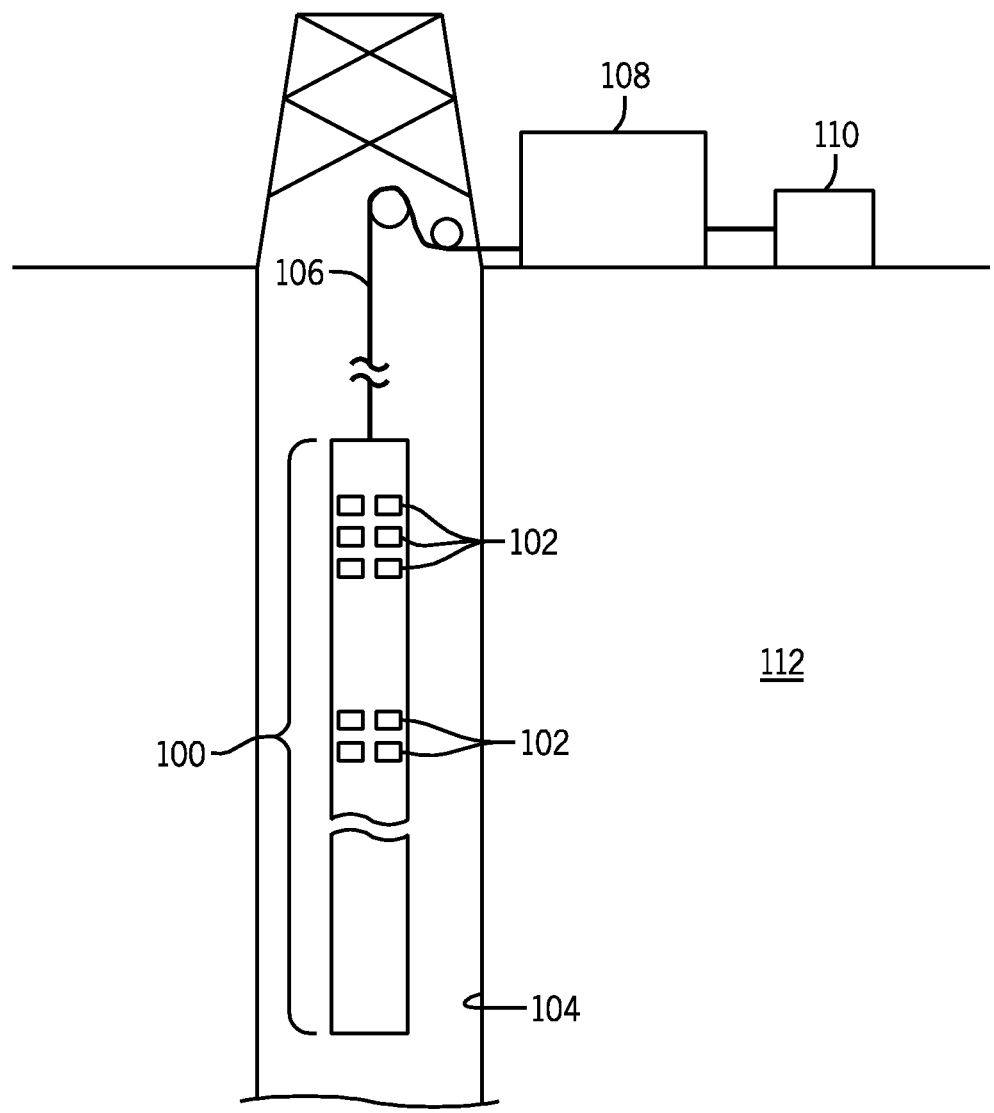
FIGS. 1 and 2 are schematic diagrams of example arrangements for performing survey operations, according to some implementations.

To characterize a subterranean structure, it is desirable to collect as many survey observations (measurement data) as possible to better understand properties of the subterranean structure that is under investigation. An observation can include measurement data of a single trace or a shot gather. A trace refers to measurement data acquired by a seismic sensor (or array of seismic sensors) for a given single shot (activation) of a seismic source. A seismic gather is a collection of seismic traces that share an acquisition parameter, such as a common midpoint or other parameter. Alternatively, an observation can be measurement data from a coil, which can include measurement data of seismic sensor(s) due to multiple shots (multiple activations of a seismic sensor) in some predefined pattern.

In practice, the number of survey observations that is available to operators is often not optimal for purposes of achieving relatively good signal quality, good resolution and adequate spatial coverage of a target subterranean structure. To enhance accuracy of characterization of target subterranean structures, pre-survey design can be performed to determine what settings associated with survey equipment would produce results of enhanced accuracy. Traditionally, such pre-survey design is manual in nature and can be labor-intensive and time-consuming.

Pre-survey designs can be based on use of models of subterranean structures. However, there can be uncertainties associated with models, due to poor knowledge about the target subterranean structure. Consequently, it is often the case that pre-survey designs are unable to determine survey equipment settings that provide superior or optimal results. Examples of survey equipment settings include positions of source-receive pairs that are deemed most valuable, or settings relating to the optimal (or enhanced) frequency bandwidth in the presence of signal attenuation, or settings relating to the type of components to use in survey equipment, and so forth. More generally, a "survey setting" refers to one or more of the following: the type of survey equipment used, positions of components of the survey equipment, operational settings of the survey equipment, and so forth.

A "survey setting" can also be considered a survey design or a design of a survey experiment, where a survey design or design of a survey experiment refers to an arrangement of survey equipment used to perform a survey operation.

Survey observations can be collected from performing seismic survey operations. A seismic survey operation involves using at least one seismic source to generate seismic waves that are propagated into a target subterranean structure. Reflected waves from the subterranean structure are then detected by seismic survey receivers, which can be deployed at a land surface above the subterranean structure, a seafloor above the subterranean structure, or towed through a body of water. Seismic survey operations can include land-based seismic survey operations, marine seismic survey operations, wellbore seismic survey operations, and so forth.

Although reference is made to seismic surveying or acquisitions in the present discussion, it is noted that techniques or mechanisms according to some embodiments are applicable to other types of survey operations, such as electromagnetic (EM) survey operations. Also, techniques or mechanisms according to some embodiments are applicable to other types of imaging contexts, such as medical imaging (of human tissue, for example), imaging of machinery or mechanical structures, and so forth.

In accordance with some embodiments, techniques or mechanisms are provided for determining survey settings that can provide for enhanced resolution in characterizing a target subterranean structure (or more generally, any other type of target structure, including human tissue, machinery, mechanical structure, etc.). The techniques or mechanisms are able to accommodate complex-valued sensitivity matrices, as well as complex-valued covariance matrices.

A "sensitivity matrix" refers to a matrix containing parameters that relate measurement data (acquired by survey equipment for a subterranean structure) to model parameters (of a model that represents the subterranean structure). A "covariance matrix" contains information that describes the uncertainty regarding a model. Each of the sensitivity matrices and covariance matrices can be complex-valued, which means that the respective matrix contains both real and imaginary values. As explained further below, the ability to employ a complex-valued sensitivity matrix (and in some cases a complex-valued covariance matrix) allows for greater flexibility in characterizing a target subterranean structure.

Although the ensuing discussion refers to sensitivity matrices and covariance matrices, note that in alternative implementations, complex-valued sensitivity data structures and complex-valued covariance data structures can be used, where a "data structure" refers to any representation that contains information in a predefined format.

In accordance with some embodiments, a link is established between a sensitivity matrix and a survey setting for minimizing (or otherwise reducing) posterior model uncertainties and to maximize (or otherwise enhance) model resolution. "Posterior" model uncertainties refer to uncertainties in a model of a subterranean structure that has been computed or adjusted based on observations acquired by a survey operation.

Survey Environments

Various different types of seismic survey operations can be performed, including a vertical seismic profile (VSP) survey operation or a surface seismic survey operation. A VSP survey arrangement is depicted in FIG. 1. A tool 100, which can include a number of seismic receivers 102 (e.g., geophones, accelerometers, etc.) can be positioned in a wellbore 104 on a carrier structure 106 (e.g., cable) that is connected to surface equipment 108. One or more seismic sources 110 (e.g., airguns, vibrators, etc.) can be positioned at the earth surface some distance from the wellbore 104. Alternatively or additionally, seismic sources can also be provided on the tool 100. When the seismic source(s) 110 is (are) activated, seismic waves travel into a subterranean structure 112 that surrounds the wellbore 104. A portion of the seismic waves can be reflected as a result of changes in acoustic impedance in the subterranean structure 112 due to the presence of various boundaries in the subterranean structure. The seismic waves that reach the wellbore 104 can be detected by the seismic receivers 102 in the wellbore 104, where the signals are recorded by the seismic receivers 102 for later processing in characterizing the subterranean structure 112.

Figure 2:
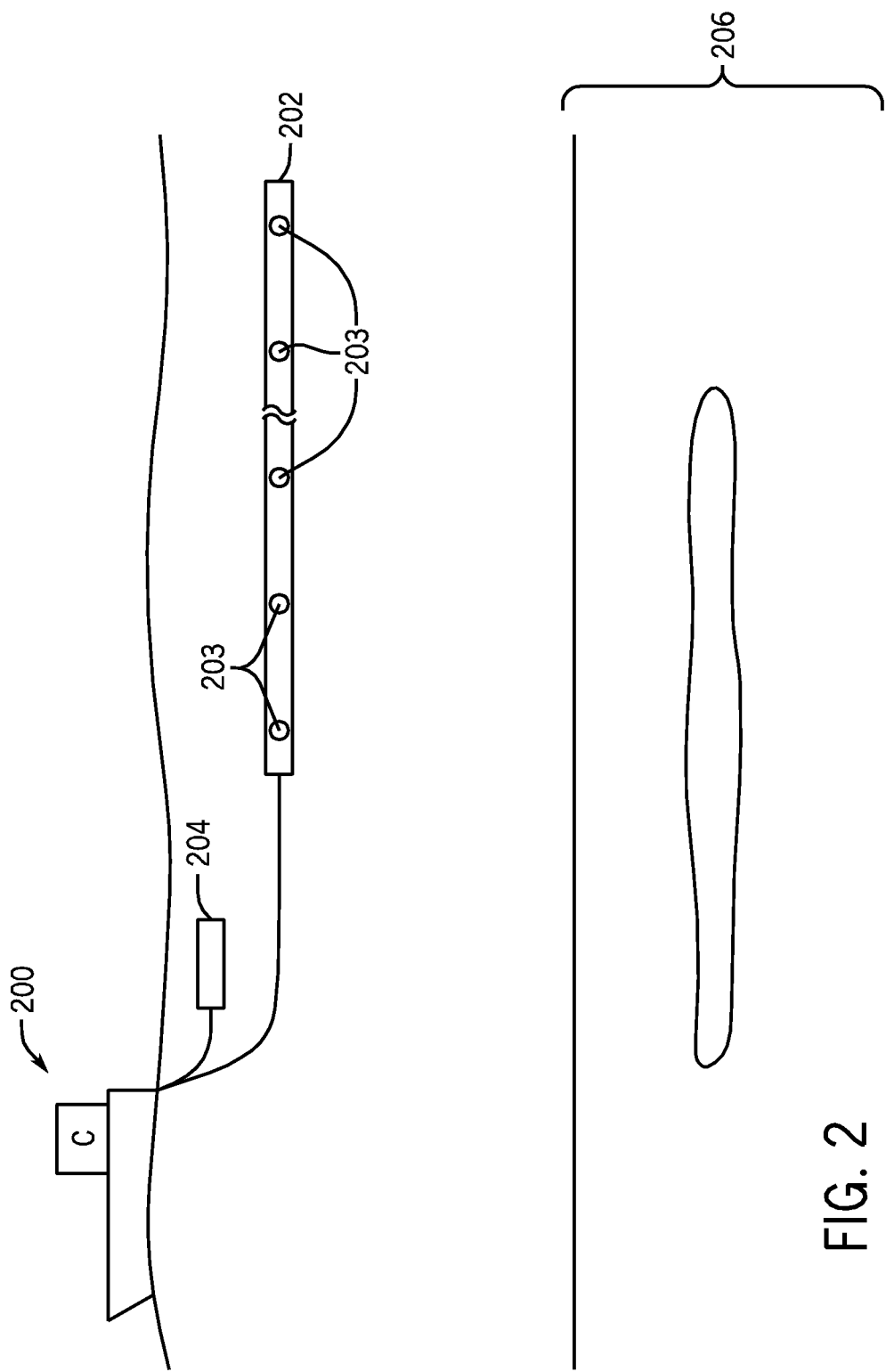

A surface seismic survey arrangement is shown in FIG. 2, which is an arrangement for performing a marine surface seismic survey. A marine vessel 200 can tow a streamer 202 (or multiple streamers) that carry seismic receivers 203. The marine vessel 200 (or a different marine vessel) can tow at least one seismic source 204 that when activated causes seismic waves to be propagated into a subterranean structure 206. Reflected waves from the subterranean structure 206 are detected by the seismic receivers 203 in the streamer(s) 202.

Another type of surface seismic survey arrangement is a land-based surface seismic survey arrangement, where seismic source(s) and seismic receivers are deployed on a land surface above the target subterranean structure.

According to another example, a seismic survey arrangement includes seismic-guided drilling equipment. The seismic-guided drilling equipment includes seismic source(s) and seismic receivers, and information acquired by the seismic receivers can be used in guiding drilling of a wellbore.

Although examples are provided of various different survey arrangements, it is noted that in alternative examples, other survey arrangements can be used. For example, such other survey arrangements can include electromagnetic survey arrangements, or survey arrangements to measure data of other types of target structures.

Techniques or mechanisms according to some embodiments for determining survey settings that can provide for enhanced resolution in characterizing a target structure can be applied in the context of any of the survey arrangements discussed above.

Survey Design Identification Procedures

Figure 3:
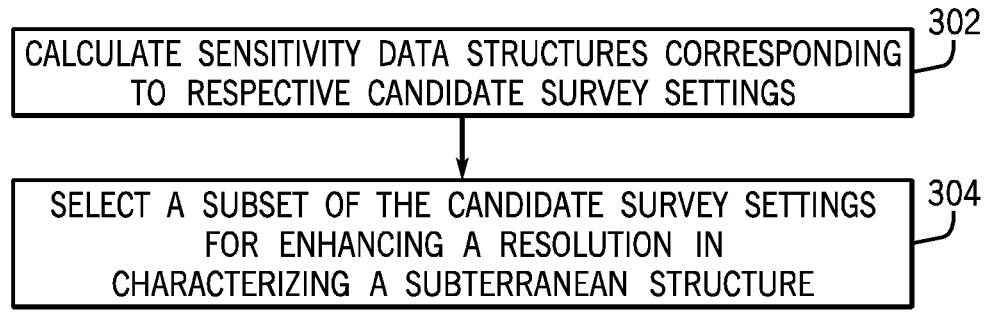
FIGS. 3 and 4 are flow diagrams of processes of determining one or more survey designs, according to various implementations.

FIG. 3 is a flow diagram of a process according to some implementations. The process includes calculating (at 302) sensitivity data structures corresponding to respective candidate survey settings, where each of the sensitivity data structures relates a corresponding set of survey observations (of a target subterranean structure) to model parameters (of a model that represents the target subterranean structure). The candidate survey settings that correspond to the sensitivity data structures represent candidate survey designs to be used for acquiring respective survey observations. Some of the candidate survey settings can produce superior results (for characterizing the target subterranean structure) as compared to other ones of the candidate survey settings.

In some implementations, the sensitivity data structures can be part of a sensitivity matrix; for example, the sensitivity data structures can be entries (e.g., rows) of the sensitivity matrix. In some implementations, the sensitivity data structures can be made up of different sensitivity matrices. In alternate implementations, other appropriate data structures can be used in light of the requirements of the application, as those with skill in the art will appreciate.

In the ensuing discussion, reference is made to a sensitivity matrix; however, it is noted that in alternative implementations, techniques or mechanisms according to some embodiments can also be applied in the context of multiple sensitivity matrices.

The sensitivity data structures can contain complex values (including both real and imaginary values). Including complex values in the sensitivity data structures allows for performance of various characterizations that cannot be achieved using sensitivity data structures that contain just real values. For example, with complex sensitivity data structures, imaging problems formulated in the frequency domain can be solved.

Based on the sensitivity data structures, the process of FIG. 3 selects (at 304) a subset (less than all) of the candidate survey settings according to a criterion for enhancing resolution in characterizing the subterranean structure. The selected subset of survey settings can include one survey setting or multiple survey settings. The goal is to find, among the candidate survey settings, the one (or ones) that is (are) likely to provide information about model parameters (of a model representing a target subterranean structure) that will complement the prior information, which includes a set of already available survey observations. In other words, the process of FIG. 3 seeks to identify a survey design (or survey designs) that is likely to minimize (or reduce) the posterior uncertainty and thus maximize (or enhance) the resolution of the model parameters (of the model representing the target subterranean structure).

The foregoing refers to implementations in which techniques are used to produce a survey design for achieving a target goal. In further implementations, a survey arrangement may already exist that has been used to acquire measurement data regarding a subterranean structure. Techniques according to some embodiments, such as according to FIG. 3, can be used to help identify a subset of the measurement data that contains more useful information—the notion here is that processing of the subset of the measurement data is more efficient than processing the full measurement data. In this manner, accelerated or more rapid processing of measurement data can be achieved, such as for purposes of quality control, providing a preliminary representation (e.g., image) of the subterranean structure for quick review, and so forth. Techniques according to some embodiments, such as according to FIG. 3, can identify a subset of the survey arrangement that satisfies the criterion for enhancing resolution in characterizing the subterranean structure. The subset of measurement data produced by the identified subset of the survey arrangement is then subject to further processing.

The ensuing discussion describes in detail how a sensitivity matrix G can be derived in accordance with an example embodiment. The sensitivity matrix G is set further forth below in Eq. 5.

Consider a viscoelastic earth model (for representing a target subterranean structure) characterized by mass density $\rho(x)$ and complex stiffness coefficients $c_{ijkl}(x)$, where x is a Cartesian position vector. The mass density and stiffness coefficients are examples of properties or parameters of a subterranean structure that can be included in a model of the subterranean structure. In other examples, a model of a subterranean structure can include other properties or parameters.

The variables i, j, k, l represent four respective dimensions, including the Cartesian dimensions x,y,z and a time dimension. The medium (of the target subterranean structure) is assumed to be contained in a semi-infinite domain of interest V. V represents a volume containing the subterranean structure, and is bounded by a closed surface $\mathcal{S} = \mathcal{S}_0 \cup \mathcal{S}_\infty$, where $\mathcal{S}_0$ is a traction-free surface and $\mathcal{S}_\infty$ is a surface at infinity where the radiation condition holds. To account for attenuation in elastic wave propagation, the stiffness coefficients $c_{ijkl}(x)$ are considered to have complex values. In addition, the stiffness coefficients are assumed to be time-independent with symmetries such that $c_{ijkl} = c_{jikl} = c_{klij} = c_{ijlk}$.

Let $u = (u_1, u_2, u_3)$ be the three-component displacement field (where the displacement field contains displacement data measured by seismic sensors), with $u_i(x, \omega)$ being the $i^{th}$ component of displacement at point x and frequency $\omega$. In other examples, other types of measurement data (instead of displacement data) can be measured, such as velocities and acceleration. Here, $x = (x_1, x_2, x_3) \equiv (x, y, z) \in V$. In the frequency domain, the elastic wave equation with attenuation can be written as $$\omega^2 \rho(x) u_i(x,\omega) + \partial_j [c_{ijkl}(x) \partial_k u_l(x,\omega)] = f_i(x,\omega) + \partial_j M_{ij}(x,\omega), \quad \text{(Eq. 1)}$$

where $\partial_j \equiv \partial/\partial x_j$, $f_i$ is a volume density of force applied in the $i^{th}$ axis direction, $M_{ij}$ is a moment density indexed by the two axis directions i and j, and where the Einstein summation convention is used. The solution of the elastic wave equation (Eq. 1) can be written as a function of the attenuative outgoing Green function $\mathcal{G}_{in}(x, x', \omega)$, as follows:

$$u_i(x,\omega) = -\int_V \mathcal{G}(x,x',\omega)[f_n(x',\omega) + \partial_j M_{nj}(x',\omega)]dV', \quad \text{(Eq. 2)}$$

where $V' \equiv V(x')$, and $x'$ represents possible locations of the medium (target subterranean structure). The Green function is a function used to solve inhomogeneous differential equations subject to initial conditions or boundary conditions. The summation over the indices n and j accounts for volume density forces applied in the three possible directions (n∈{1, 2,3}), and for the moment densities with (n, j)∈{(1,2), (1,3), (2,3)}.

Now, let $u^{(0)} \equiv (u_1^{(0)}, u_2^{(0)}, u_3^{(0)})$ be the displacement field due to sources $\{F, \nabla M\} \equiv \{f_i, \partial_j M_{ij}\}$, in a medium represented by the model vector $m^{(0)} \equiv (\rho^{(0)}, \{c_{ijkl}^{(0)}\})$. Consider that a model m (which represents a target subterranean structure) is obtained by adding a perturbation model represented by the vector $\Delta m = (\Delta\rho, \{\Delta c_{ijkl}\})$ to $m^{(0)}$ so that $$\rho = \rho^{(0)} + \Delta\rho \quad \text{(Eq. 3)}$$

$$c_{ijkl} = c_{ijkl}^{(0)} + \Delta c_{ijkl}.$$

In Eq. 3, each of the density ρ and stiffness coefficient $c_{ijkl}$ is based on a previous value of the density and stiffness coefficient, respectively, as modified by a perturbation (change) of the density ($\Delta\rho$) and stiffness coefficient ($\Delta c_{ijkl}$), respectively. In the foregoing, $m^{(0)}$ can be considered the initial model of the subterranean structure, and m is considered an updated model after an adjustment of $m^{(0)}$ using the model perturbation represented by the vector $\Delta m$. Alternatively, $m^{(0)}$ can be considered the previous model (which has been updated in a previous iteration, where the previous model is to be further updated to updated model m in the present iteration).

Under the Born approximation, a perturbation of the model parameters, $\Delta m$, such that $m = m^{(0)} + \Delta m$, leads to a perturbation of the displacement fields (measurement data), $\Delta u \equiv (\Delta u_1, \Delta u_2, \Delta u_3)$ so that $u = u^{(0)} + \Delta u$. Inserting the expressions of Eq. 3 into Eq. 1, and assuming single scattering and neglecting higher order terms yields the perturbed displacement fields $\Delta u_i$ that are also solutions of the attenuative elastic wave equation with) $m^{(0)}$ as the propagation medium and $\Delta m$ as the scattering source. Thus, the Born approximation perturbation displacement fields can be written as $$\Delta u_i(x,\omega) = \omega^2 \int_V \mathcal{G}_{ij}^{(0)}(x,x',\omega) u_j^{(0)}(x',\omega) \Delta\rho(x') dV' - \int_V \partial'_k[$$
$$\mathcal{G}_{in}^{(0)}(x,x',\omega)]\Delta c_{nklj}(x')\partial'_l u_j^{(0)}(x',\omega) dV'. \quad \text{(Eq. 4)}$$

where $\mathcal{G}_{in}(x, x', \omega)$ is the outgoing Green function in the unperturbed medium, and $u_i^{(0)}(x', \omega)$ is the unperturbed incident wave, expressed as $u_i^{(0)}(x, \omega) = -\int_V \Sigma_j \mathcal{G}_{ij}^{(0)}(x, x', \omega) s_j(x', \omega) dV'$. Also, $\Delta\rho$ represents contrasts in density, and $\Delta c_{nklj}$ represents a contrast in a stiffness coefficient.

As noted above, a goal according to some embodiments is to select a survey design (survey setting) that would yield, a posteriori, the best (or enhanced) resolution of model parameters. Assuming a model contains mass density ρ(x) and stiffness coefficients $c_{ijkl}(x)$, as noted above, for example, then the goal is to find a survey setting that is likely to be the most sensitive to the model parameters $\Delta\rho$ and $\Delta c_{ijkl}$. To that end, Eq. 4 set forth above carries two pieces of information. Eq. 4 shows that the Born approximation perturbation displacement fields $\Delta u$ are linearly related to the perturbation model parameters $\Delta m = (\Delta\rho, \{\Delta c_{ijkl}\})$ (which, in general, has 1+6×6 components, for example). Eq. 4 also expresses the fact that displacement data, recorded at receiver location x, results from contributions from wavefields possibly coming from the locations x' in the medium.

The linearity between the Born approximation displacement fields and the model parameters implies that Eq. 4 can be written in a compact form as $$\Delta u = G\Delta m, \quad \text{(Eq. 5)}$$

where G, the sensitivity matrix, is a possibly complex N×(1+6×6)M sensitivity matrix. Here, N and (1+6×6)M, for example, are the number of measurement observations and the number of model parameters, respectively. For $u_i(x_j, \omega)$, the $i^{th}$ displacement component data recorded at a given receiver location $x_j$, the elements $G_{ij}^{(\rho)}$ and $G_{ij}^{(c)}$ of the sensitivity matrix G represent the contributions to be associated with the mass density ρ(x') and the stiffness coefficients $c_{ijkl}$(x'), respectively. These elements, which make up the sensitivity matrix G, are defined by the functional derivatives $$G_{ij}^{(\rho)} \equiv \frac{\delta[\Delta u_i(x_j, \omega)]}{\delta[\Delta\rho(x')]} = \omega^2 \mathcal{G}_{il}^{(0)}(x_j, x', w) u_l^{(0)}(x', w), \quad \text{(Eq. 6)}$$

$$G_{ij}^{(c)} \equiv \frac{\delta[\Delta u_i(x_j, \omega)]}{\delta[\Delta c_{nklp}(x')]} = -\partial'_k[\mathcal{G}_{in}^{(0)}(x_j, x', w)]\partial'_l u_p^{(0)}(x', w). \quad \text{(Eq. 7)}$$

where $\mathcal{G}_{il}$ represents the outgoing Green function, which can be complex. As noted above, the Green function is a function used to solve inhomogeneous differential equations subject to initial conditions or boundary conditions.

The sensitivity matrix G thus relates measurement data (acquired for a target structure) to parameters of a model (that represents the target structure). More specifically, according to Eq. 5, the sensitivity matrix G relates perturbation measurement data ($\Delta u$) to a perturbation of the model ($\Delta m$).

The following describes the link between the sensitivity matrix G and survey settings to minimize (or reduce) the posterior model uncertainties associated with solving Eq. 5, and to maximize (or enhance) the corresponding model resolution.

Assuming that what is known about the prior model $m^{(0)}$ (which can be the initial model or the previous model) and data uncertainties are their means and covariances, the optimal (or enhanced) approximation for the prior model and data noise distributions is the multivariate normal distribution. In such circumstances, the Bayesian least-square solution of the linear system of Eq. 5 is a Gaussian distribution $\mathcal{N}_M(\widetilde{\Delta m}, \tilde{C})$ with center $$\widetilde{\Delta m} = CG^H(GCG^H + C_D)^{-1}\Delta u_{obs} \quad \text{(Eq. 8)}$$

and covariance $$\tilde{C} = (G^H C_D^{-1} G + C^{-1})^{-1}, \quad \text{(Eq. 9)}$$

where the superscript H denotes a Hermitian transpose, $\widetilde{\Delta m}$ represents a mean solution for the model of the target subterranean structure, $\Delta u_{obs} = \Delta u + e$ is a vector of noisy measurements with noise, $e \sim \mathcal{N}_D(0, C_D)$ and the uncertainties on the prior model are described by $\mathcal{N}_M(0, C)$. In Eqs. 8 and 9, $C_D$ represents the prior covariance matrix on the measurement data, which represents uncertainty regarding measurement data. Also, C represents the prior covariance matrix on the model, which represents uncertainty regarding model parameters. A "prior" covariance matrix describes uncertainty before acquisition of data and selection of a particular survey setting. The matrix $\tilde{C}$ is a posterior covariance matrix, which represents uncertainty following acquisition of data and selection of a particular survey setting. In the general case $C_D$, C, and $\tilde{C}$ are positive-definite, Hermitian matrices of complex $\Delta u$ (measurement data acquired by survey equipment) and $\Delta m$ (model parameters). Eq. 8 provides a mean solution for the model parameters.

The posterior covariance matrix $\tilde{C}$ helps to analyze how well the system has been resolved due to selection of a particular survey setting for acquiring survey observations. The diagonal elements of $\tilde{C}$ are the variances (commonly referred to as error bars) on the posterior values of the model parameters $\widetilde{\Delta m}$. The off-diagonal elements are the covariances and provide a measure on how well a given model parameter has been resolved independently of the others. Ideally, a perfectly resolved system would lead to a posterior covariance matrix $\tilde{C}$ with zero error bars on the resolved model parameters. In such cases, the associated determinant, det($\tilde{C}$), of the posterior covariance matrix is zero.

If one then knew the true model, then $\widetilde{\Delta m} = \Delta m_{exact}$. However, in practice, the posterior model is more likely to be a filtered version of the exact model. Such a filtered version of $\widetilde{\Delta m}$ is represented as $$\widetilde{\Delta m} = R \Delta m_{exact},\qquad(\text{Eq. 10})$$

wherein R is the resolution matrix:

$$R \equiv CG^H(GCG^H + C_D)^{-1}G = I - \tilde{C}C^{-1}.\qquad(\text{Eq. 11})$$

In Eq. 11, I is the identity matrix, where the identify matrix has is the main diagonal and 0s elsewhere. The resolution matrix R represents how a survey system distorts a model from an exact model of a target subterranean structure. The columns of the resolution matrix indicate how a delta function in the exact model would be mapped in the estimated model. In some examples, the columns include the point-spread functions (PSF) associated with R. The rows of the resolution matrix R indicate how the exact model parameters are averaged to obtain a given estimated model parameter. The rows are sometimes referred to as the Backus-Gilbert averaging kernels. Also it follows from Eq. 11 that $$\tilde{C} = (I-R)C,\qquad(\text{Eq. 12})$$

which shows that any departure of $\tilde{C}$ (the posterior covariance matrix) from the null matrix indicates imperfect resolution, as represented by R.

For a set of observations, $\{\Delta u_n\}$ (where n represents a present iteration and n iterates from 1 to some predefined number), collected based on a corresponding survey setting $\{\xi_n\} \equiv \{\xi : \xi \in \Xi\}$, the least-square solution of Eq. 5 is the Gaussian distribution $\mathcal{N}_M(\widetilde{\Delta m}, \tilde{C})$ if one assumes that the uncertainties associated with the prior model and with the observations are Gaussian and described by $\mathcal{N}_M(0, C)$ and $\mathcal{N}_D(0, C_D)$, respectively. In the foregoing, $\Xi$ represents the universe of candidate survey settings that are considered.

Techniques or mechanisms according to some embodiments seek to find, among a plurality of candidate survey designs (survey settings), the one or ones that is (are) likely to provide information about the model parameters that will better complement the prior information, in particular, the set of already available observations. The result is the identification of a setting that may minimize (or reduce) the posterior uncertainty and thus maximize (or enhance) the resolution of the model parameters of the model that represents the target subterranean structure. To achieve the above, the following objective function is used:

$$\xi_{opt}^{(C)} \equiv \underset{\xi \in \Xi}{\text{argmax}}\, \frac{det(C)}{det(\tilde{C})}, \text{ for a fixed}|\Xi|,\qquad(\text{Eq. 13})$$

where |•| stands for the cardinal and det(•) for the determinant, and where Eq. 13 seeks to find a survey setting from $\xi$ that results in a maximum of the ratio det(C)/det($\tilde{C}$). A determinant of a matrix (which in Eq. 13 includes C or $\tilde{C}$) is a value computed from the elements of the matrix by predefined rules. The ratio of determinants, det(C)/det($\tilde{C}$), is referred to as the "C-norm." The objective function of Eq. 13 is equivalent to minimizing tr(R) (trace of R), which effectively reduces the distortion represented by R. Said differently, the objective function constitutes a criterion for enhancing resolution in characterizing the target structure, by reducing distortion represented by R.

The process of identifying a survey setting (defining a survey design to acquire a respective observation), or multiple survey settings, is an iterative process that is performed on an observation-by-observation basis. Note that different observations are acquired using survey equipment having different survey settings. Thus, in the ensuing discussion, reference to selecting an observation is the equivalent of selecting a respective survey setting.

Figure 4:
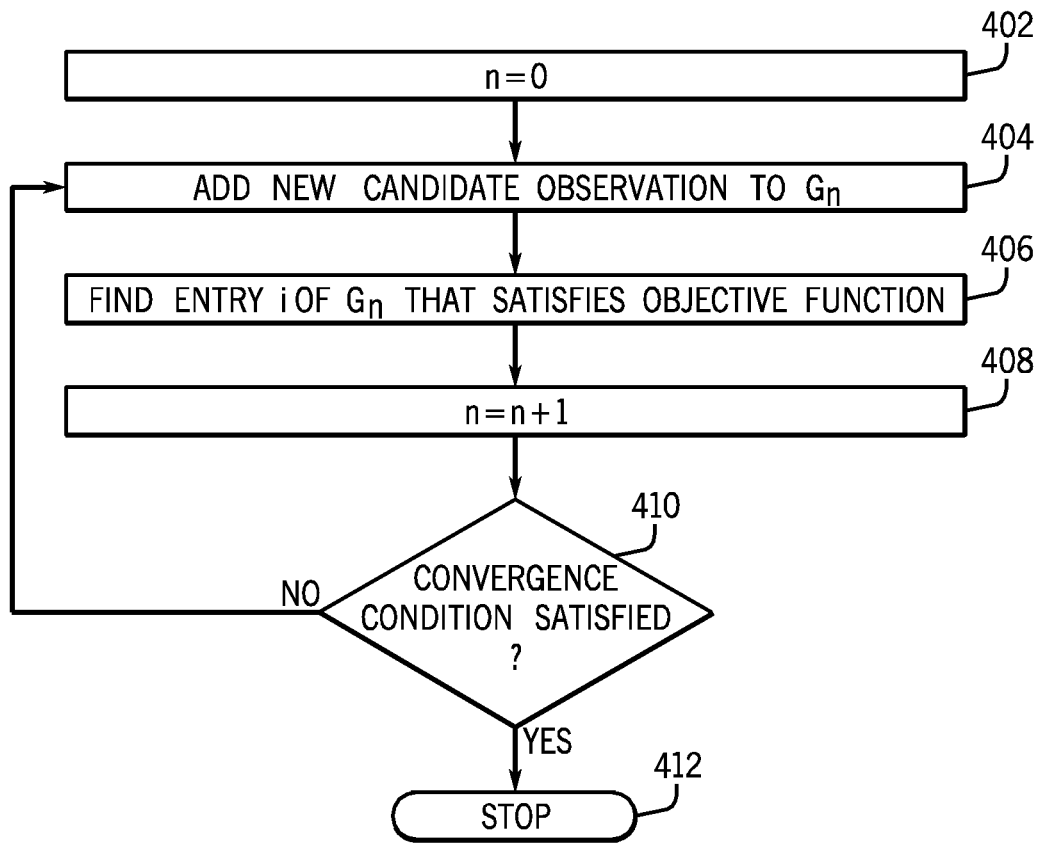

The iterative procedure for identifying a survey setting (or survey settings) on an observation-by-observation basis is depicted in FIG. 4. An iteration variable, n, is initialized to zero (at 402). This variable is incremented with each successive iteration. Let $G_n$ be a sensitivity matrix whose rows correspond to the observations chosen so far from the rows of the sensitivity matrix G, and let $g_{n+1}^T$ be a row of G corresponding to a candidate observation. In the beginning, $G_n$ is an empty matrix (when n=0), with no observations. However, as observations are chosen from G and added to $G_n$, $G_n$ is incrementally updated one entry (e.g., row) at a time, by adding (at 404) the current candidate observation, $g_{n+1}^T$, which is chosen from G. Thus, at iteration n+1, the sensitivity matrix $G_{n+1}$ of the experiment under consideration is given by the block matrix $$G_{n+1} = \begin{bmatrix} G_n \\ g_{n+1}^T \end{bmatrix},\qquad(\text{Eq. 14})$$

where n=1, 2, . . . . In the most general case, the data prior covariance matrix, $C_D$, may be written as $$(C_D)_{n+1} = \begin{bmatrix} (C_D)_n & c_{n+1} \\ c_{n+1}^H & \sigma_{n+1}^2 \end{bmatrix}\qquad(\text{Eq. 15})$$

wherein $(C_D)_n$ is the data prior covariance matrix of the base experiment data (the measurement data prior to addition of the current candidate observation $g_{n+1}^T$), $\sigma_{n+1}^2$ is the variance of the data measurement that corresponds to the new candidate observation, $g_{n+1}^T$, and $c_{n+1}$ is the vector whose components are the covariance terms of the new candidate observation, $g_{n+1}^T$.

It can be shown that the objective function in Eq. 13 takes on the iterative form $$\frac{det(C_n)}{det(C_{n+1})} = (1 + g_{n+1}^T A^{-1} h^*) \quad \text{(Eq. 16)}$$

$$det(I + BG_n C_n G_n^H) \left[ 1 + k^T \left( A^{-1} - \frac{A^{-1} h^* g_{n+1}^T A^{-1}}{1 + g_{n+1}^T A^{-1} h^*} \right) g_{n+1}^* \right],$$

where $$A \equiv C_n^{-1} + G_n^H BG_n, \quad \text{(Eq. 17)}$$

$$B \equiv \sigma_{n+1}^{-2} \phi_{n+1}^{-1} (C_D)_n^{-1} c_{n+1} c_{n+1}^H (C_D)_n^{-1}, \quad \text{(Eq. 18)}$$

$$h^* \equiv \sigma_{n+1}^{-2} \phi_{n+1}^{-1} [g_{n+1}^* - G_n^H (C_D)_n^{-1} c_{n+1}], \quad \text{(Eq. 19)}$$

$$k^T \equiv -\sigma_{n+1}^{-2} \phi_{n+1}^{-1} c_{n+1}^H (C_D)_n^{-1} G_n, \quad \text{(Eq. 20)}$$

$$\phi_{n+1} \equiv 1 - \sigma_{n+1}^{-2} c_{n+1}^H (C_D)_n^{-1} c_{n+1}, \quad \text{(Eq. 21)}$$

where the superscript * stands for the complex conjugate. In Eq. 16, $C_n$, represents the prior covariance matrix on the model, whereas $C_{n+1}$ represents the posterior covariance matrix. For uncorrelated data noise, c=0 and, consequently, Eq. 16 reduces to a simpler expression $$\frac{det(C_n)}{det(C_{n+1})} = 1 + \sigma_{n+1}^{-2} g_{n+1}^T C_n g_{n+1}^* \quad \text{(Eq. 22)}$$

$$= 1 + \sigma_{n+1}^{-2} g_{n+1}^H C_n^* g_{n+1} \quad \text{(Eq. 23)}$$

where the Hermiticity of the covariance matrix has been invoked.

From among the observations corresponding to the entries of $G_n$, the procedure of FIG. 4 identifies (at 406) an entry i of $G_n$ that maximizes the following objective function derived from Eq. 22:

$$\frac{det(C_i)}{det(C_{i+1})} = 1 + \sigma_{i+1}^{-2} g_{i+1}^T C_n g_{i+1}^*. \quad \text{(Eq. 24)}$$

Next, n is incremented (at 408) by 1 to perform continue to the next iteration.

The procedure next determines (at 410) if a convergence condition has been satisfied. If not, then the procedure proceeds to perform tasks 404, 406, and 408 for the next iteration. If the convergence condition has been satisfied, then the procedure stops (at 412), and the survey setting corresponding to entry i of $G_n$ identified at 406 is returned as the selected optimal (or enhanced) survey setting.

An example convergence condition can include the following condition: adding a new observation to the experiment, as represented by $G_n$, no longer results in significant improvement of the ratio defined by Eq. 22; for example, if the improvement of the ratio defined by Eq. 22 is less than some predefined threshold, then that is an indication that the convergence condition has been met. Another example convergence condition can be that the number of observations added to $G_n$ has exceeded some predefined maximum number.

A benefit of using the iterative procedure of FIG. 4 is that the entirety of the sensitivity matrix G does not have to be considered to find the optimal (or enhanced) survey setting (s). The sensitivity matrix G can be large and thus it may be computationally expensive to consider the entirety of the entries of the sensitivity matrix G. In accordance with some implementations, by considering the partial matrix $G_n$, and stopping when a convergence condition has been met, computational efficiency can be enhanced.

The foregoing has described Bayesian techniques for selecting survey designs that optimally maximizes (or enhances) model parameter resolution for characterizing target structures, such as subterranean structures, human tissues, machinery, mechanical structures, and so forth. The techniques according to some implementations are referred to as Bayesian D-optimality-based techniques, based on usage of an objective function (e.g., Eq. 13 or 22) that seeks to maximize a ratio of determinants of covariance matrices. The techniques are able to select observation(s) that is (are) likely to reduce the forecast uncertainties on the model parameters.

In practice, an observation can be associated with multiple measurements (e.g., a seismic sensor can record the waveforms of both P-waves and S-waves, where P-waves refer to compression waves, and S-waves refer to sheer waves). In cases where each observation has multiple measurements, the foregoing techniques can augment the survey design with k ($k \geq 2$) measurements at a time. Let $\Gamma = [\Gamma_1 \ \Gamma_2 \ \ldots \ \Gamma_k]^T$ be the matrix whose rows $\Gamma_i^T$, $1 \leq i \leq k \ll M$, are the sensitivity kernels of the relevant seismic sensors. For uncorrelated data, i.e., for $$(C_D)_{n+k} = \begin{bmatrix} (C_D)_n & 0 \\ 0 & S \end{bmatrix}, \quad \text{(Eq. 25)}$$

wherein $S = (\sigma_i^2 \delta_{ij})_{i,j \leq k}$, where $\sigma_{ij}$ is the Kronecker delta, a one-time rank-k augmentation can be defined as $$\frac{det(C_n)}{det(C_{n+k})} = \frac{det(S + \Gamma C_n \Gamma^H)}{det(S)}. \quad \text{(Eq. 26)}$$

Marginal Covariance

Techniques or mechanisms according to some embodiments can be modified to focus on a particular subregion of interest within a target subterranean structure (where the particular subregion is less than the entirety of the target subterranean structure). In other words, rather than focus on the entire target subterranean structure, an enhanced (or optimal) survey design (or survey designs) can be identified for a subregion in the target subterranean structure.

To focus on a particular subregion of interest (rather than the entire target subterranean structure), the prior covariance matrix C, which describes quantitative uncertainties in the model parameters, can be used to specify the particular subregion of interest by assigning a higher prior uncertainty to that particular subregion. A design criterion can be used to preserve the C matrix description of the quantitative uncertainties while defining the particular subregion of interest separately. For this particular subregion of interest, the posterior marginal covariance matrix for the model at iteration n is given by $T_n$, which is a marginal covariance matrix (marginal in the sense that it focuses on a subregion of a model). The objective function in this case is to find the design $$\xi_T^{(opt)} \equiv \underset{\xi \in \Xi}{\operatorname{argmax}} \frac{det(T_n)}{det(T_{n+1})}, \text{ for a fixed } |\Xi|, \quad \text{(Eq. 27)}$$

instead of $\xi_C^{(opt)}$ in Eq. 13 or 22. Note that the objective function of Eq. 27 is based on a ratio of determinants of the $T_n$ and $T_{n+1}$ matrices, rather than the by $C_N$ and $C_{n+1}$ of the objective function of Eq. 13 or 22 discussed further above. The above ratio of determinants in Eq. 27 is referred to as the T-norm.

With uncorrelated measurement noise the posterior model covariance matrix at iteration n+1 reduces to $$C_{n+1} = C_n - \frac{\sigma_{n+1}^{-2} C_n g_{n+1}^* g_{n+1}^T C_n}{1 + \sigma_{n+1}^{-2} g_{n+1}^T C_n g_{n+1}^*}. \quad \text{(Eq. 28)}$$

Consider the following partition of the posterior covariance matrix $$C_n = \begin{pmatrix} T_n & X_n \\ X_n^H & Y_n \end{pmatrix}, \quad \text{(Eq. 29)}$$

where $T_n$ is the $M_T \times M_T$ marginal covariance matrix ($M_T < M$). Consider also the following partition of the sensitivity kernel $g_{n+1}$ $$g_{n+1} = \begin{pmatrix} \bar{g}_{n+1} \\ h_{n+1} \end{pmatrix}, \quad \text{(Eq. 30)}$$

where $\bar{g}_{n+1}$ is the "restricted" sensitivity kernel. It is restricted in the sense that it has just $M_T$ components. In Eq. 30, $h_{n+1}$ represents the remainder of the sensitivity kernel $g_{n+1}$ that is outside the particular region of interest. The restricted kernel $\bar{g}_{n+1}$ is the part of the sensitivity kernel that is just sensitive to the model parameters in the particular region of interest. Therefore, the updated marginal covariance matrix is given by $$T_{n+1} = T_n - \frac{\sigma_{n+1}^{-2}(T_n \bar{g}_{n+1}^* + X_n h_{n+1}^*)(\bar{g}_{n+1}^T T_n + h_{n+1}^T X_n^H)}{1 + \sigma_{n+1}^{-2} g_{n+1}^T C_n g_{n+1}^*} \quad \text{(Eq. 31)}$$

$$\equiv T_n - a_{n+1} a_{n+1}^H - a_{n+1} b_{n+1}^H - b_{n+1} a_{n+1}^H - b_{n+1} b_{n+1}^H, \quad \text{(Eq. 32)}$$

where the vectors $a_{n+1}$ and $b_{n+1}$ are defined as follows $$a_{n+1} \equiv \frac{\sigma_{n+1}^{-1} T_n \bar{g}_{n+1}^*}{\sqrt{1 + \sigma_{n+1}^{-2} g_{n+1}^T C_n g_{n+1}^*}}, \quad \text{(Eq. 33)}$$

$$b_{n+1} \equiv \frac{\sigma_{n+1}^{-1} X_n h_{n+1}^*}{\sqrt{1 + \sigma_{n+1}^{-2} g_{n+1}^T C_n g_{n+1}^*}}, \quad \text{(Eq. 34)}$$

Note that it is unnecessary to expand the denominator in terms of the partitions $T_n$, $X_n$, $\bar{g}_{n+1}$, and $h_{n+1}$. Eq. 32 shows that the updated marginal covariance matrix, $T_{n+1}$, is a rank-four update of $T_n$. Recursive application of the matrix determinant lemma yields $$\frac{det(T_n)}{det(T_{n+1})} = \{[1 - a_{n+1}^H T_n^{-1} a_{n+1}][1 - b_{n+1}^H (T_n - a_{n+1} a_{n+1}^H)^{-1} a_{n+1}] \times \quad \text{(Eq. 35)}$$

$$[1 - a_{n+1}^H (T_n - a_{n+1} a_{n+1}^H - a_{n+1} b_{n+1}^H)^{-1} b_{n+1}] \times$$

$$[1 - b_{n+1}^H (T_n - a_{n+1} a_{n+1}^H - a_{n+1} b_{n+1}^H - b_{n+1} a_{n+1}^H)^{-1} b_{n+1}]\}^{-1}. \quad \text{(Eq. 36)}$$

The Sherman-Morrison formula gives the rank-one update of the inverse of a matrix and it may be used to expand the right-hand side of Eq. 35. The final result would be an expression that involves just one matrix inverse, namely $T_n^{-1}$, and this through inner products with vectors. The latter can be efficiently evaluated using a Cholesky decomposition of $T_n$.

Stacking

It is desirable to achieve a better signal-to-noise ratio in measurement data acquired by a survey arrangement. Poor signal-to-noise ratio can result in reduced resolution of model parameters.

To improve signal-to-noise ratio in a survey design, techniques or mechanisms according to some implementations can implement stacking, in which an observation associated with a particular survey setting can be selected multiple times. For example, a particular source-receiver pair (a combination of a seismic source and a seismic sensor) in a survey arrangement can be selected multiple times to collect observations at different times. The observations of this particular source-receiver pair can then be combined (a process referred to as "stacking") to improve the signal-to-noise ratio of the measurement data acquired by the particular source-receiver pair.

Selecting a particular observation multiple times can refer to using the same source-receiver pair multiple times, as noted above. Alternatively, selecting a particular observation multiple times can refer to selecting a first source-receiver pair, as well as at least a second source-receiver pair (e.g., same source but another seismic sensor that is nearby, to within some predefined distance, to the seismic sensor of the first source-receiver pair).

In the context of performing survey design as discussed above, selecting an observation multiple times refers to selecting a particular entry of a sensitivity matrix (or selecting a particular sensitivity data structure) multiple times, which can result in a reduction in the model uncertainty.

The following discusses an example in which the same observation is selected twice in a survey system that has a particular source-receiver pair and two scatterers placed at distances 1 m and (1+Δ) m from the source-receiver pair. A "scatterer" refers to an element in the target structure that causes scattering of a wavefield (e.g., seismic wavefield). In the context of a subterranean structure, a scatter can represent an interface of the subterranean structure between inhomogeneous structures that cause scattering of wavefields.

The foregoing example survey system is further assumed to include just two potential observations: the observation for which the wave propagation constant is $k_1$ and the observation for which the wave propagation constant is $k_2 > k_1$. The wave propagation constant represents a characteristic of the target structure that affects propagation of wavefields (e.g., seismic wavefields).

The observation with wave propagation constant is $k_1$ is referred to as the first observation, and the observation with wave propagation constant is $k_2$ is referred to as the second observation. Let the model prior covariance matrix and the data prior covariance matrix be, respectively:

$$C = \sigma^2 \begin{bmatrix} 1 & e^{-\frac{\Delta}{L}} \\ e^{-\frac{\Delta}{L}} & 1 \end{bmatrix}, C_D = \begin{bmatrix} \sigma_1^2 & 0 \\ 0 & \sigma_2^2 \end{bmatrix}. \quad \text{(Eq. 67)}$$

According to Eq. 67, the data is assumed to be uncorrelated and the model parameters are assumed to be correlated with correlation length L. Upon using the one-dimensional Green kernels, the sensitivity matrix for this system takes on the form $$G = \frac{1}{4}\begin{bmatrix} e^{2ik_1} & e^{2i(1+\Delta)k_1} \\ e^{2ik_2} & e^{2i(1+\Delta)k_2} \end{bmatrix} \quad \text{(Eq. 68)}$$

Consequently, the C-norms corresponding to the first and second observations are, respectively, $$\frac{\sigma^2}{8\sigma_1^2}\left[1 + e^{-\frac{\Delta}{L}}\cos(2\Delta k_1)\right], \frac{\sigma^2}{8\sigma_2^2}\left[1 + e^{-\frac{\Delta}{L}}\cos(2\Delta k_2)\right]. \quad \text{(Eq. 69)}$$

If an algorithm is to favor the first observation over the second observation, i.e., if the algorithm is to suggest the counter-intuitive situation where the lower-frequency observation is favored over the higher-frequency observation, the data noises and the model variances would have to satisfy $$\frac{\sigma_2^2}{\sigma_1^2} > \frac{1 + e^{-\frac{\Delta}{L}}\cos(2\Delta k_2)}{1 + e^{-\frac{\Delta}{L}}\cos(2\Delta k_1)}. \quad \text{(Eq. 70)}$$

This condition is an intricate relationship between the model and data uncertainties, the correlation length, the wavelengths (or frequencies) involved, and the separation between scatterers.

The foregoing assumes the circumstance under which the algorithm selects the first observation. After updating the posterior model covariance, the following new C-norms are obtained:

$$\frac{\sigma^2\left(1 + e^{-\frac{\Delta}{L}}\cos[2\Delta k_1]\right)}{\sigma^2\left(1 + e^{-\frac{\Delta}{L}}\cos[2\Delta k_1]\right) + 8\sigma_1^2}, \quad \text{(Eq. 71)}$$

$$\frac{\sigma^4\left(e^{-\frac{2\Delta}{L}} - 1\right)\cos^2[2\Delta(k_1 - k_2)] + 8\sigma_1^2\sigma^2\left[1 + e^{-\frac{\Delta}{L}}\cos(2\Delta k_2)\right]}{8\sigma_2^2\left[\sigma^2 e^{-\frac{\Delta}{L}}\cos(2\Delta k_1) + \sigma^2 + 8\sigma_1^2\right]},$$

where the expression on the left corresponds to the first observation and the expression on the right corresponds to the second observation. Setting the left-hand-side expression larger than the right-hand-side expression can yield improved resolution of the model. If the foregoing condition is satisfied, then stacking of measurements (of a selected observation) may improve the resolution of the model.

Determining Survey Design for a Model Having a Dip Scatterer

In some cases, inhomogeneities within a subterranean structure to be characterized can be modeled as a discrete set of point scatterers. The elastic radiation (corresponding to scattered seismic wavefields) emanating from each point scatterer can be assumed to be essentially isotropic (the scattering radiation is invariant with direction). However, in practice, the stratified structure of the subterranean structure often gives rise to inhomogeneities for which scattering radiation is generally anisotropic. As a result, modeling inhomogeneities as point scatterers with isotropic characteristics may not produce accurate results.

To address the foregoing, techniques or mechanisms according to alternative implementations can include, in a model of a target structure, information relating to scatterers (which correspond to inhomogeneities in the target structure) with having anisotropic radiation patterns. Such scatterers can be referred to as dipping scatterers, since each such scatterer can be considered to represent a dipping interface in the target structure that has an anisotropic radiation pattern when scattering wavefields. As discussed in further detail, dipping scatterers can be represented as a scatterer having a finite size (rather than just a point).

For uncorrelated data noise, Eq. 13 (discussed further above) reduces to the following iterative expression:

$$\xi_{opt}^{(n)} = \arg\max_{\xi \in \Xi} \|\gamma_{n+1}\|_{C_n^*}^2, \text{ for a fixed } |\Xi|, \quad \text{(Eq. 72)}$$

where $\gamma_{n+1} \equiv \sigma_{n+1}^{-1} g_{n+1}$, $\sigma_{n+1}$ is the data standard deviation and $g_{n+1}^T$ is the sensitivity kernel of a candidate observation (i.e., an entry, such as a row, of the sensitivity matrix). The C*-norm is defined as $\|\gamma_{n+1}\|_{C_n^*}^2 \equiv \gamma_{n+1}^H C_n^* \gamma_{n+1}$, where H stands for the Hermitian conjugate and * for the complex conjugate.

In the frequency domain, the general equation governing elastodynamic phenomena can be written as $$\omega^2 \rho(x) u_i(x,\omega) + \Sigma_{j,k,l} \partial_j [c_{ijkl}(X) \partial_k u_l(x,\omega)] = s_i(x,\omega) \quad \text{(Eq. 73)}$$

where $u_i(x,\omega)$ is the $i^{th}$ component of displacement at point $x \in V$ and frequency $\omega$, $\partial_j \equiv \partial/\partial x_j$, and $s_i(x,\omega)$ the source term. This source term is defined in terms of the volume density of force $f_i(x,\omega)$ and the volume density of moment $M_{ij}(x,\omega)$ as $$s_i(x,\omega) \equiv f_i(x,\omega) + \Sigma_j \partial_j M_{ij}(x,\omega). \quad \text{(Eq. 74)}$$

The solution of Eq. 73 may be expressed as a function of the outgoing Green function $\mathcal{G}_{in}(x, x', \omega)$ as $$u_i(x,\omega) = -\int_V \Sigma_j \mathcal{G}_{ij}(x,x',\omega) s_j(x',\omega) d^3x'. \quad \text{(Eq. 75)}$$

If it is assumed that the propagation medium (target subterranean structure) represented by the vector $m(x) \equiv (\rho(x), \{c_{ijkl}(x)\})$ is viewed as the superposition of a reference medium represented by the vector $m^{(0)}(x) \equiv (\rho^{(0)}(x), \{c_{ijkl}^{(0)}(x)\})$ and a perturbation model represented by the vector $\Delta m(x) \equiv (\Delta\rho(x), \{\Delta c_{ijkl}(x)\})$ so that $$\rho(x) = \rho^{(0)}(x) + \Delta\rho(x)$$

$$c_{ijkl}(x) = c_{ijkl}^{(0)}(x) \Delta c_{ijkl}(x). \quad \text{(Eq. 76)}$$

Note that Eq. 76 is similar to Eq. 3 set forth further above. Under the Born approximation, the scattered displacement fields can be written as $$\Delta u_i(x,\omega) = \omega^2 \int_V \Sigma_j \mathcal{G}_{ij}(x,x',\omega) u_j^{(0)}(x',\omega) \Delta\rho(x') d^3x'$$

$$-\int_V \Sigma_{j,k,l,n} \partial'_k [\mathcal{G}_{in}(x,x',\omega)] \Delta c_{nklj}(x') \partial'_l u_j^{(0)}(x',\omega) d^3x', \quad \text{(Eq. 77)}$$

wherein $\mathcal{G}_{in}^{(0)}(x, x', \omega)$ is the outgoing Green function in the unperturbed medium and $u_i^{(0)}(x', \omega)$ is the unperturbed field in the reference medium given by $$u_i^{(0)}(x,\omega) = -\int_V \Sigma_j \mathcal{G}_{ij}^{(0)}(x,x',\omega) s_j(x',\omega) d^3x'. \quad \text{(Eq. 78)}$$

In Eq. 77, there is no assumption regarding any particular source type nor is there any assumption regarding any particular structure for the inhomogeneities in the propagation medium. To account for anisotropic scattering radiation in the propagation medium, inhomogeneities in the propagation medium can be represented as one-dimensional or two-dimensional scattering elements (the dipping scatterers discussed further above).

It may be sufficient to assume that the contrasts in elastic parameters are constant over the extent of each individual scattering element, although the elastic parameters may vary from one scattering element to another. Thus, the model parameters (density and stiffness coefficient perturbations) corresponding to M scattering elements with respective constant contrasts $\Delta\rho_\beta$ and $(\Delta c_{ijkl})_\beta$, $\beta=1, 2, \ldots, M$, are given by $$\Delta\rho(x) = \Sigma_{\beta=1}^{M} \Delta\rho_\beta \Psi_\beta^{(D)}(x)$$

$$\Delta c_{ijkl}(x) = \Sigma_{\beta=1}^{(6\times 6)M} (\Delta c_{ijkl})_\beta \Psi_\beta^{(D)}(x) \quad \text{(Eq. 79)}$$

wherein the $\Psi_\beta^{(D)}$'s are indicator functions that encode the shape of the scattering elements.) Thus, information pertaining to dipping scatterers are included in models by use of the $\Psi_\beta^{(D)}$ functions.

According to Huygens's principle, a D-dimensional scatterer $\mathcal{A}_\beta^{(D)}$, $D=1, 2, \ldots$, may be viewed as including a continuous set of point scatterers. Thus, the form factors may be defined as $$\Psi_\beta^{(D)}(x) \equiv \mathcal{A}_\beta \delta(x - y_\beta(\Lambda^{(D)})) d\Lambda^{(D)}, \quad \text{(Eq. 80)}$$

where $\delta(\bullet)$ stands for the Dirac delta and $\Lambda^{(D)}$ stands for the set of integration parameters that characterize the spatial extent of the scattering elements. For a line-segment $\mathcal{A}_\beta^{(1)}$, $\Lambda^{(1)}$ is a real number. However, when the scattering elements are two-dimensional elements (e.g., two-dimensional disks), $\mathcal{A}_\beta^{(2)}$ and $\Lambda^{(2)}$ take on the form of a pair of real numbers: the first real number spans the radial extent of the two-dimensional element and the second number represents the element's sweeping angle (i.e., $\Lambda^{(2)} \equiv (\nu, \phi) \in [0,1] \times [0,2\pi]$, for instance). Substituting Eq. 80 into Eq. 77 and taking into account the definition of $\Psi_{\Psi\beta}^{(D)}(x)$ yields $$\Delta u_i(x, \omega) = \sum_{\beta=1}^{M} \omega^2 \Delta\rho_\beta \int_{\mathcal{A}_\beta^{(D)}} \sum_j \mathcal{G}_{ij}^{(0)}(x, y_\beta(\Lambda^{(D)}), \omega) u_j^{(0)}(y_\beta(\Lambda^{(D)}), \omega) d\Lambda^{(D)} - \sum_{\beta=1}^{M} \int_{\mathcal{A}_\beta^{(D)}} \sum_{j,k,l,n} (\Delta c_{nklj})_\beta [\partial_k' \mathcal{G}_{in}^{(0)}(x, x', \omega) \partial_l' u_j^{(0)}(x', \omega)]_{x'=y_\beta(\Lambda^{(D)})} d\Lambda^{(D)}. \quad \text{(Eq. 81)}$$

Eq. 81 may be written concisely as $$\Delta u_i = \Sigma_{\beta=1}^{(1+6\times 6)M} G_{i\beta} \Delta m_\beta, \quad \text{(Eq. 82)}$$

where $\{\Delta m_\beta\}_{1 \leq \beta \leq M}$ represent the mass density contrasts, $\{\Delta m_\beta\}_{M+1 \leq \beta \leq (6\times 6)M}$ represent the stiffness contrasts, and $G_{i\beta}$ are the entries of a possibly complex $N \times (1+6\times 6)M$ sensitivity matrix. N and $(1+6\times 6)M$ are the number of displacement observations and the number of model parameters, respectively. The entries of the sensitivity matrix, $G_{i\beta}$, can be split into two categories: entries $G_{i\beta}^{(p)}$ that represent the contributions associated with the mass density contrasts $\Delta\rho_\beta$, and $G_{i\beta}^{(c)}$ that represent the contributions associated with the stiffness contrasts $(\Delta c_{nklj})_\beta$. They are given by $$G_{i\beta}^{(p)} \equiv \omega^2 \int_{\mathcal{A}_\beta^{(D)}} \sum_j \mathcal{G}_{ij}^{(0)}(x, y_\beta(\Lambda^{(D)}), \omega) u_j^{(0)}(y_\beta(\Lambda^{(D)}), \omega) d\Lambda^{(D)} \quad \text{(Eq. 83)}$$

$$G_{i\beta}^{(c)} \equiv -\int_{\mathcal{A}_\beta^{(D)}} [\partial_k' \mathcal{G}_{in}^{(0)}(x, x', \omega) \partial_l' u_j^{(0)}(x', \omega)]_{x'=y_\beta(\Lambda^{(D)})} d\Lambda^{(D)}.$$

The introduction of a spatial extent for the scattering elements manifests itself as an overall factor that multiplies the matrix entries of the point-scatterers case. This factor reduces to unity when the spatial extent vanishes and reproduces the effects of specular reflection (point scattering). The spatial extent of the scattering element can be used as a controllable parameter to characterize the uncertainty on a structural dipping interface—a higher confidence in the dipping character of the scattering structure may translate into larger sizes for the scattering element, thereby making the scattering more specular. For instance, in the 2D acoustic example, a heuristic rule of thumb could be $$l : \phi^{-1} : \sigma_{dip}^{-1}, \quad \text{(Eq. 84)}$$

where l is the length of the line-segment scatterer, $\phi$ is a measure of the beam width which could be, for instance, the half-power beamwidth (HPBW) or the first-null beamwidth (FNBW) Balanis-bk, and $\sigma_{dip}$ is the dip-angle standard deviation. The parameter $\phi$ is identified with $\sigma_{dip}$. Introducing the normalized length $0 \leq \bar{l} \equiv l/\lambda < \infty$ and the normalized standard deviation $0 \leq \bar{\sigma}_{dip} \equiv \sigma_{dip}/\pi \leq 1$, one can devise another simple expression that is more quantitatively meaningful than Eq. 84 and which has the appropriate asymptotic behavior, namely $$\bar{l} \equiv \frac{1}{\bar{\sigma}_{dip}} - 1. \quad \text{(Eq. 85)}$$

Given a particular uncertainty on the dip, $\bar{\sigma}_{dip}$, Eq. 85 allows for the calculation of the size (represented as $\bar{l}$) of the scattering element.

Computing Environment

Figure 5:
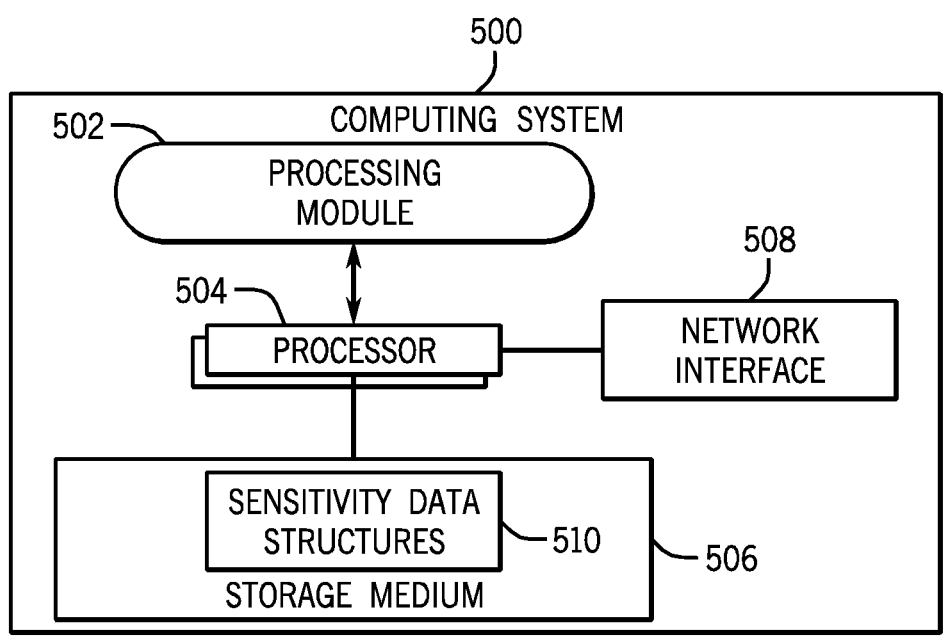
FIG. 5 is a block diagram of an example system that incorporates some implementations.

FIG. 5 is a block diagram of a computing system 500 that includes a processing module 502 that is able to perform tasks of FIGS. 3 and 4. The processing module 502 is executable on one or multiple processors 504. A processor can include a microprocessor, microcontroller, processor module or subsystem, programmable integrated circuit, programmable gate array, or another control or computing device. The processing module 502 can be implemented as machine-readable instructions.

The computing system 500 includes a storage medium 506 (or storage media). In addition, the computing system 500 includes a network interface 508 that can communicate over a network. The storage medium (or storage media) 506 can be used to store sensitivity data structures 510, as well as other data structures discussed above.

The storage medium 506 (or storage media) can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    calculating complex-valued sensitivity data structures corresponding to respective candidate survey settings, wherein the sensitivity data structures relate measurement data associated with a target structure to at least one parameter of a model of the target structure;
    selecting, based on the sensitivity data structures, a subset of the candidate survey settings according to a criterion for enhancing resolution in characterizing the target structure; and
    configuring survey equipment according to at least one survey setting in the subset of the candidate survey settings to perform a survey operation of the target structure.

2. The method of claim 1, wherein the criterion is based on identifying at least one of the candidate survey settings that reduces posterior uncertainty.

3. The method of claim 1, wherein selecting the subset comprises performing an iterative procedure, the iterative procedure comprising:
    adding one of the sensitivity data structures to a collection of sensitivity data structures previously considered; and
    based on a present content of the collection of the sensitivity data structures, identifying, according to the criterion, one of the candidate survey settings corresponding to the present content of the collection.

4. The method of claim 3, wherein the iterative procedure further comprises:
    determining whether a convergence condition has been satisfied; and
    in response to the convergence condition not being satisfied, continuing with the iterative procedure by adding a further sensitivity data structure to the collection, and based on a further present content of the collection, identifying, according to the criterion, one of the candidate survey settings corresponding to the further present content of the collection.

5. The method of claim 1, wherein a particular one of the candidate survey settings includes at least one item selected from the group consisting of: type of survey equipment, a position of at least one component of the survey equipment, at least one operational characteristic of the survey equipment.

6. The method of claim 1, wherein the criterion is according to a ratio between a determinant of a prior covariance matrix and a determinant of a posterior covariance matrix.

7. The method of claim 1, wherein the sensitivity data structures include information relating to the at least one model parameter that is sensitive to a subregion less than an entirety of the target structure.

8. The method of claim 1, wherein the at least one parameter of the model accounts for an anisotropic radiation pattern of a scatterer in the target structure.

9. The method of claim 8, wherein the at least one parameter of the model is based on a function that encodes a shape of the scatterer.

10. The method of claim 1, wherein selecting the subset of the candidate survey settings comprises selecting a particular candidate survey settings plural times to allow for stacking of measurement data acquired by the particular candidate survey setting.

11. The method of claim 1, further comprising using a process including the calculating and the selecting to identify, for further processing, a subset of measurement data acquired by a survey arrangement including the configured survey equipment.

12. An article comprising at least one non-transitory machine-readable storage medium storing instructions that upon execution cause a system to:
    calculate complex-valued sensitivity data structures corresponding to respective candidate survey settings, wherein the sensitivity data structures relate measurement data associated with a target structure to at least one parameter of a model of the target structure;
    select, based on the sensitivity data structures, a subset of the candidate survey settings according to a criterion for enhancing resolution in characterizing the target structure; and
    processing survey data acquired by survey equipment configured according to at least one survey setting in the subset of the candidate survey settings.

13. The article of claim 12, wherein the sensitivity data structures relate perturbations of measurement data to perturbations of the at least one model parameter.

14. The article of claim 12, wherein the target structure comprises a target subterranean structure.

15. The article of claim 12, wherein the criterion is based on prior covariance information relating to the model.

16. The article of claim 15, wherein the criterion is based on a value derived from a determinant of the prior covariance information and a determinant of posterior covariance information.

17. The article of claim 12, wherein the selecting is performed using an iterative procedure in which individual ones of the sensitivity data structures are added to a collection of sensitivity data structures for consideration with successive iterations.

18. The article of claim 12, wherein the at least one parameter of the model accounts for an anisotropic radiation pattern of a scatterer in the target structure.

19. A system comprising:
- at least one storage medium to store complex-valued sensitivity data structures corresponding to respective candidate survey settings, wherein the sensitivity data structures relate measurement data associated with a target structure to at least one parameter of a model of the target structure;
- at least one processor to select, based on the sensitivity data structures, a subset of the candidate survey settings according to a criterion for enhancing resolution in characterizing the target structure; and
- survey equipment configured according to at least one survey setting of the subset of the candidate survey settings.

20. The system of claim 19, wherein the criterion is based on prior covariance information relating to the model.

21. The method of claim 1, wherein the configuring of the survey equipment comprises one or more of adjusting an operational characteristic of a component in the survey equipment, positioning a component in the survey equipment, and using a selected type of component in the survey equipment.

* * * * *